Oct. 3, 1967 W. J. PODBIELNIAK ET AL 3,344,981
CENTRIFUGAL APPARATUS WITH AXIALLY-EXTENDED ROTOR
Filed Feb. 8, 1965
5 Sheets-Sheet 3
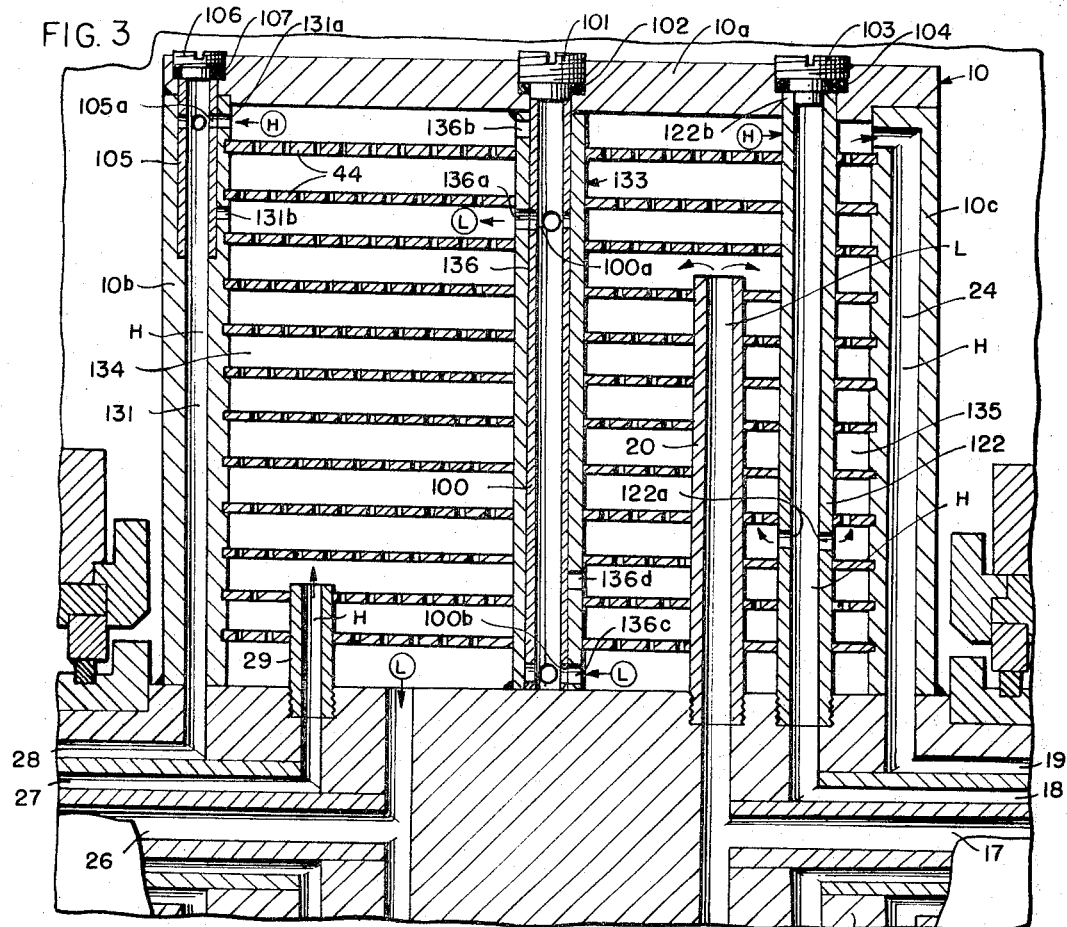
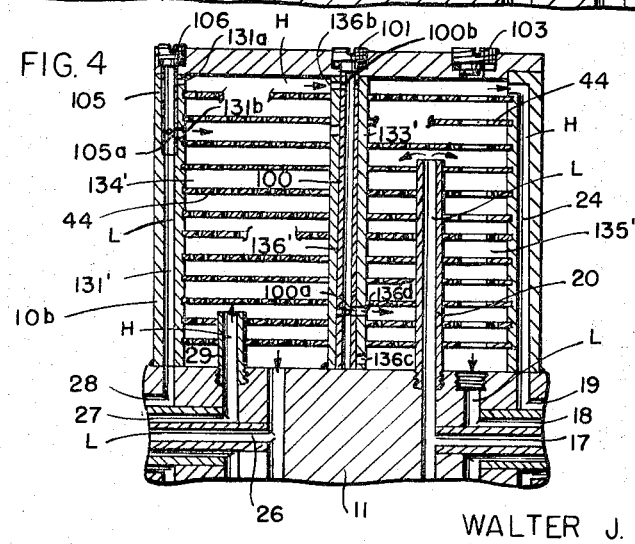
INVENTORS:
WALTER J. PODBIELNIAK
DAVID B. TODD
BY Dawson, Tilton, Fallon, Lungmus & Alexander
ATT'YS INVENTORS:
WALTER J. PODBIELNIAK
DAVID B. TODD
BY Dawson, Tilton, Fallon, Lungmus & Alexander
ATT'YS

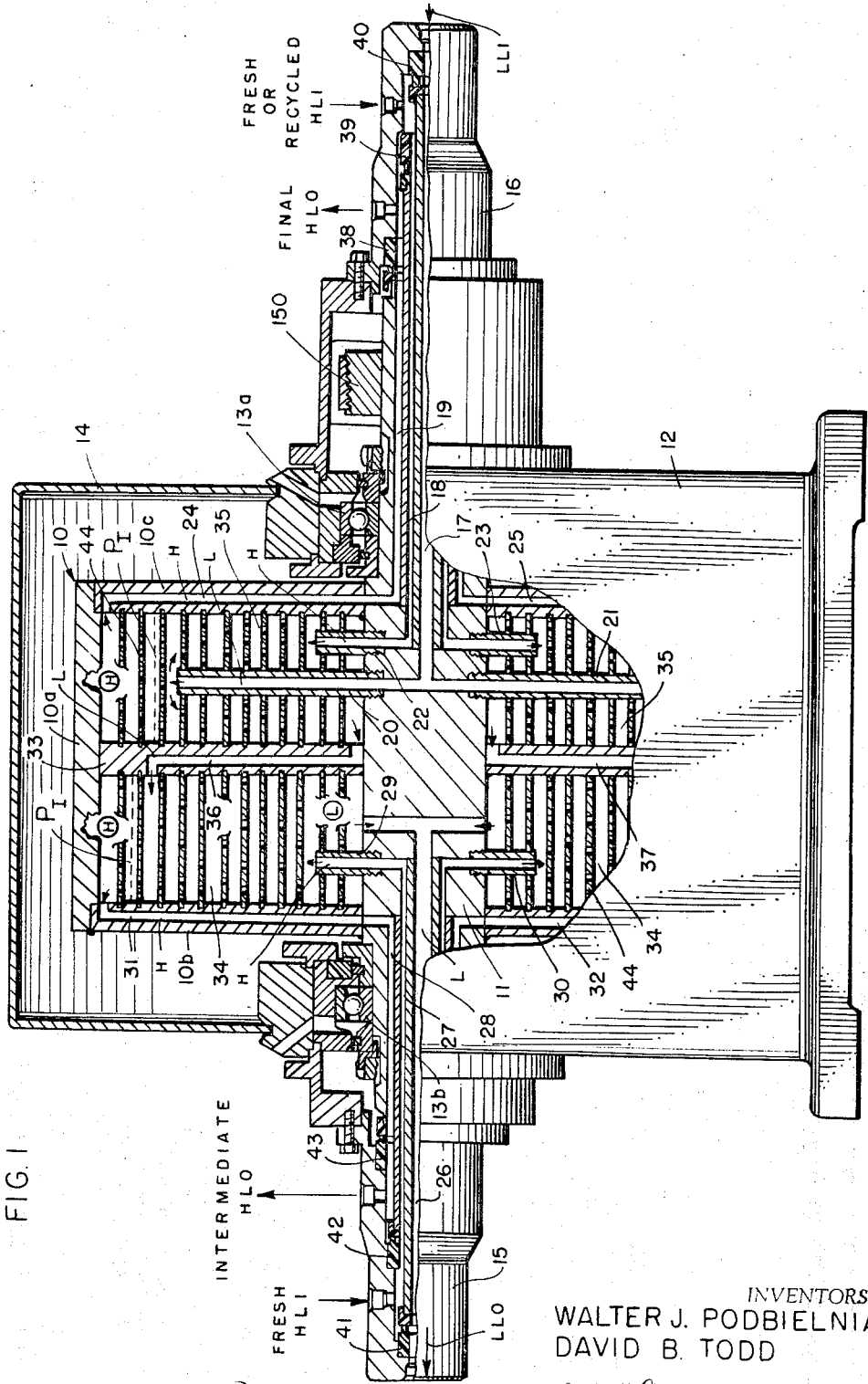

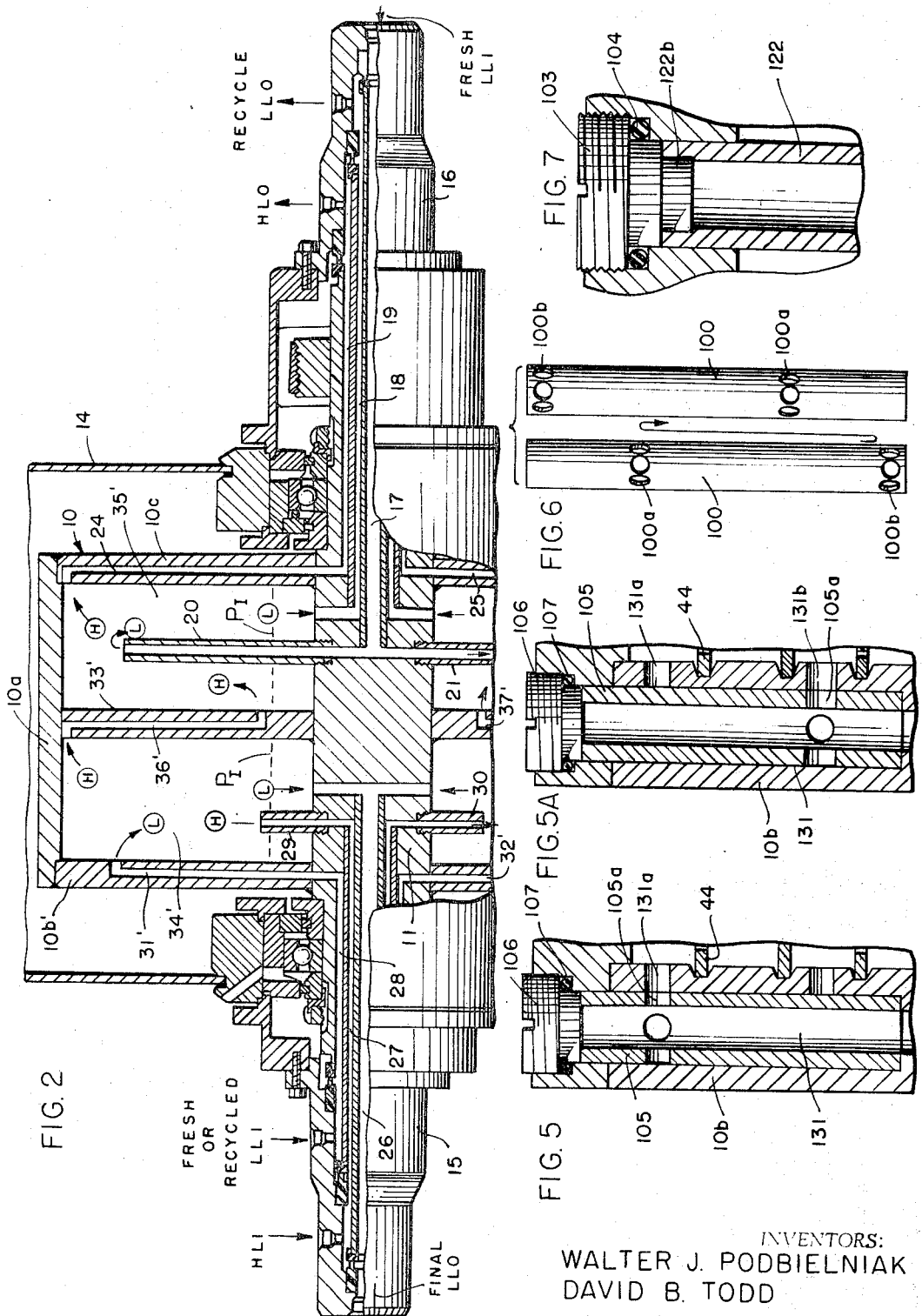

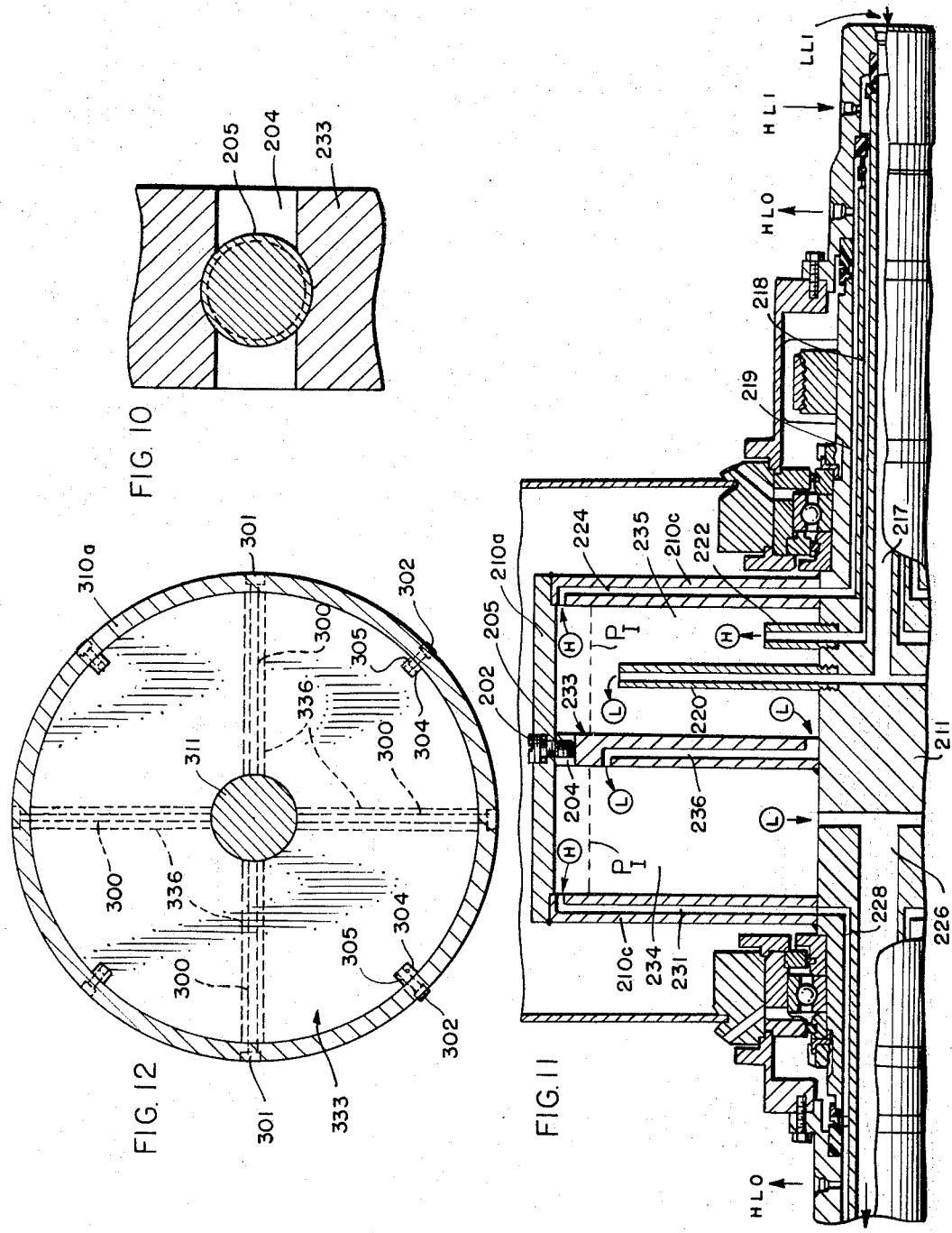

United States Patent Office 3,344,981
Patented Oct. 3, 1967

3,344,981
CENTRIFUGAL APPARATUS WITH AXIALLY-EXTENDED ROTOR
Walter J. Podbielniak, Chicago, and David B. Todd, Park Ridge, Ill., assignors to Dresser Industries, Inc., Dallas, Tex., a corporation of Delaware
Filed Feb. 8, 1965, Ser. No. 430,924
14 Claims. (Cl. 233—15)

ABSTRACT OF THE DISCLOSURE

Apparatus for successive centrifugal countercurrent contacting of liquid phases having different densities includes a rotor of generally cylindrical configuration defined by a shaft, parallel end walls and an intermediate partition fixed to said shaft, and a closing peripheral wall, defining two side-by-side chambers. Radially-spaced bands in said chambers provide for separation of the phases during the contacting. Heavy and light liquid phases are introduced respectively adjacent to the radially inner and outer peripheries of the first working chamber. These phases are removed at the respective opposite peripheries of the chamber, one of the phases being conveyed through the partition to the second working chamber and being introduced adjacent to the periphery of the second chamber corresponding to that in which it was introduced into the first chamber. Recycled or fresh liquid of the opposite phase is introduced at the opposite periphery of the second chamber for additional countercurrent contacting in the second chamber. Convertible passages are provided for converting the apparatus from one wherein the heavy phase liquid is transferred directly from the first working chamber to the second working chamber, to an apparatus wherein the light phase liquid is so transferred.

---

This invention relates to a centrifugal apparatus with an axially-extended rotor. More particularly, the invention is concerned with a centrifugal apparatus for countercurrently contacting and separating at least partially immiscible liquid phases of different densities wherein the rotor is extended axially to provide for series, multiple, or other progressive phase treatment in separate rotor chambers. The apparatus of this invention has particular utility for dual extraction selectively of the heavy liquid or the light liquid, and permitting recycling of the heavy or light liquid after the first extraction. The apparatus also has utility for reclarification of the light liquid after the completion of the extraction.

The present invention represents a further development and modification of centrifugal countercurrent extraction apparatus of the kind described in prior Patents 2,758,783 and 2,758,784. Such apparatus is designed for the counter-current contacting of substantially immiscible liquid phases having different densities. The specific kind of apparatus with which the present invention is concerned includes a rotatively mounted, horizontally-extending shaft providing a plurality of liquid flow passages therein. The shaft is equipped with liquid seals at each end which are designed to permit liquids to be introduced and removed from the shaft passages while the shaft is being rotated. A rotor casing is mounted coaxially on the shaft and provides a pressure retaining working space therein which extends outwardly from the shaft. A plurality of contacting elements, such as perforated rings, are mounted in radially spaced relation within the rotor working space to provide a plurality of extraction stages. The shaft passages are employed for introducing and removing the heavy and light phases, the rotor inlets and outlets being arranged to provide for countercurrent contacting of the heavy and light phases after the heavy phase moves outwardly within the rotor and the light phase moves inwardly. After passing through clarifying regions, the heavy and light liquids are respectively removed from the outer and inner portions of the rotor.

While centrifugal apparatus constructed and operating as just described are in widespread commercial use for many different extracting and contacting operations, such apparatus has heretofore had certain design limitations which were believed to be inherent. To perform multistage extractions, the working space of the rotor is provided with a plurality of axially concentric, radially spaced contacting elements which provide increasing numbers of stages as the number of elements is increased and with increasing rotor diameter.

To promote the sequential mixing and coalescing of the phases, the rotors are designed to operate at high rotational speeds. However, the maximum safe rotational speed decreases as the diameter of the rotor increases. For example, the rotational speeds of rotors having diameters from 20″ to 50″ will usually range from 4000 to 1600 r.p.m. While rotors may be constructed up to 60″ in diameter, it is usually preferred to utilize diameters of less than 50″. For a 60″ diameter rotor, a rotational speed as low as 1200 r.p.m. may be required.

In order to obtain a sufficient number of stages to provide the required extraction efficiency, it would be necessary to employ a rotor of so large a diameter that the cost would be excessive for the particular extraction. Another factor, as already indicated, is that larger diameter rotors must be operated at slower speeds, and decreasing operating speed may reduce efficiency. Providing a series of separate units of smaller diameter does not solve these problems satisfactorily in all cases. Employing two or more units to achieve the same number of extraction stages may involve a considerably greater apparatus cost than where a single unit of greater diameter is employed. This is particularly true where the larger diameter unit is designed to be operated at or near capacity. Another important design consideration is that each extractor must provide for and facilitate independent control of the principal interface.

A different but somewhat related problem arises from the relatively low centrifugal forces which are generated in the inner portion of the rotor adjacent the shaft. Since the light phase flows inwardly through the rotor, and is removed from a position adjacent the shaft, the inner portion of the rotor has been employed for the clarification of the light phase. In certain cases, however, it is difficult to achieve a sufficiently clarified light phase, especially for large diameter rotors where the rotational speeds are relatively low, and therefore the problem of deficient centrifugal force in the inner portion of the rotor is particularly acute. Extending the light phase clarifying region outwardly would partially solve the problem, but it has the disadvantage of decreasing efficiency in a given diameter rotor because more of the rotor space is utilized for the light phase clarifying region at the expense of the radial width of the countercurrent contacting section.

It is, therefore, an object of the present invention to provide a centrifugal apparatus of the kind described which embodies an improved and modified construction and combination of elements which substantially overcomes the problems and difficulties expressed above. More specifically, it is an object to provide a centrifugal countercurrent extraction apparatus which provides both the required capacity and efficiency in an apparatus of substantially lower cost than present apparatus of this kind, without sacrificing independent control of the principal interface in each extraction chamber. Still another object is to provide centrifugal apparatus which permits the light phase to be reclarified, thereby achieving a fully clarified light phase, without having to employ a rotor of greater diameter or reduce the radial extent of the contacting section. Further objects and advantages will be indicated in the following detailed specification.

This invention is shown in illustrative embodiments in the accompanying drawings, in which—

FIGURE 1 is a front elevational view of a centrifugal apparatus embodying design features of the present invention, which apparatus is particularly designed for dual contacting of the light liquid with either the same heavy liquid (fresh or recycled) or with two different heavy liquids;

FIG. 2 is a front elevational view of a modified form of the apparatus of FIG. 1, which is particularly adapted for the dual contacting of the heavy liquid, thereby providing the reverse set-up from the design of FIG. 1;

FIG. 3 is a fragmentary side sectional view of a further modification of the rotor of FIGS. 1 and 2, the modification facilitating the selective conversion of the rotor from the operational set-up of FIG. 1 to that of FIG. 2, or vice versa, the operational set-up as shown in FIG. 3 being the same as that for FIG. 1;

FIG. 4 is a fragmentary side sectional view of the apparatus of FIG. 3 showing the rotor converted to the set-up of FIG. 2;

FIG. 5 is a fragmentary enlarged view of one of the convertible means of the apparatus of FIGS. 3 and 4, the means shown being usable as heavy phase outlet means in the set-up of FIG. 3, and as light phase inlet means in the set-up of FIG. 4;

FIG. 5A is a fragmentary sectional view of the convertible means of FIG. 5 showing the means arranged as a light phase inlet means, whereas in FIG. 5 it is arranged as a heavy phase outlet means, these figures respectively corresponding to the set-ups of FIGS. 3 and 4;

Figure 8:
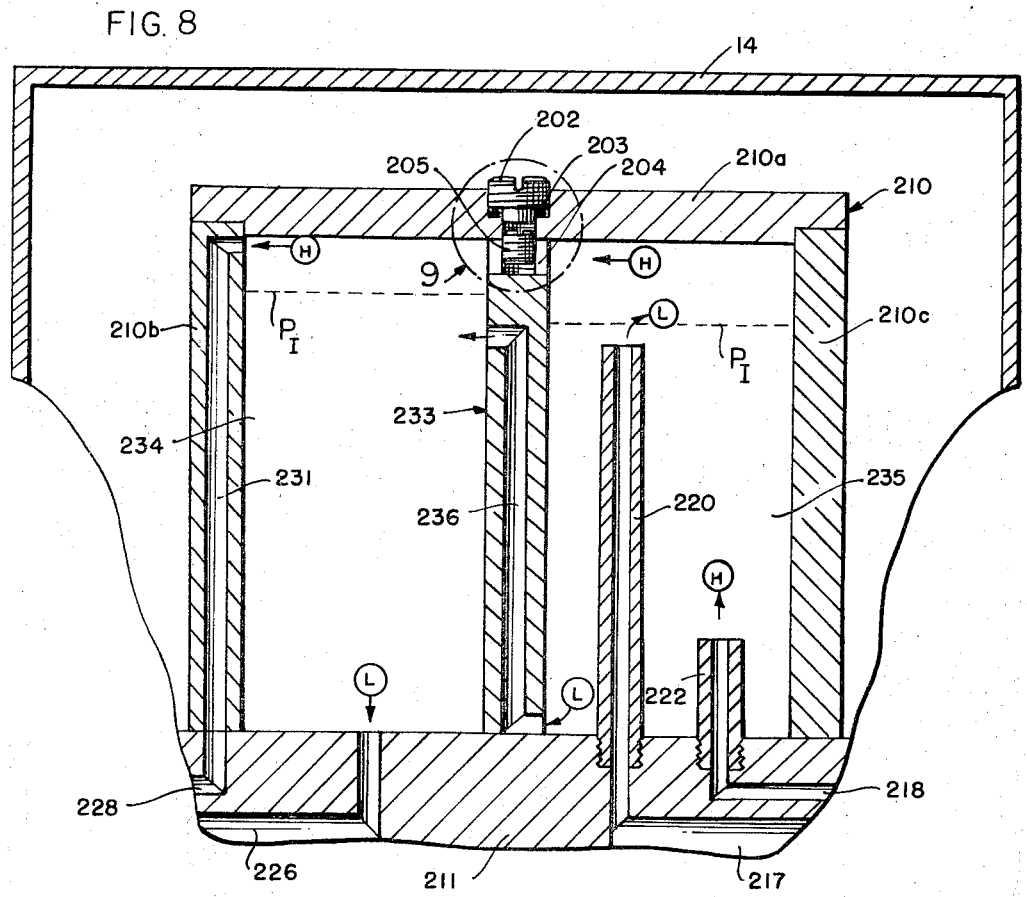
Figure 9:
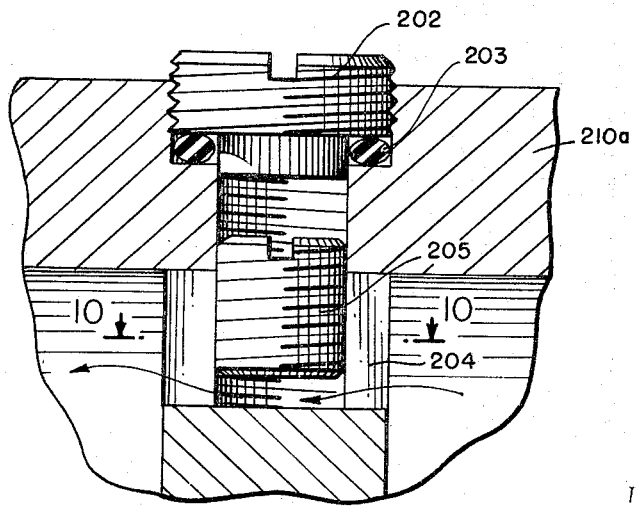

FIG. 6 is a side elevational view of another of the convertible means of the apparatus of FIGS. 3 and 4, the left-hand portion of the figure illustrating the position of the means like that of FIG. 3 for use in transferring the light phase from the right-hand chamber to the left-hand chamber, while the position in FIG. 6 corresponds to that of FIG. 4 where the means is arranged for transferring the heavy phase from the left-hand chamber to the right-hand chamber;

FIG. 7 is a fragmentary enlarged sectional view of the upper portion of the means of FIG. 6 as it appears in the assembled condition in the set-up of FIG. 3;

FIG. 8 is a fragmentary side elevational view of another modification of the rotor, which may be employed for reclarification of the light liquid;

FIG. 9 is a fragmentary enlarged sectional view of one of the variable by-pass openings through the outer portion of the central partition wall of the apparatus;

FIG. 10 is a sectional view of the by-pass throttle means taken on line 10—10 of FIG. 9;

FIG. 11 is a side sectional view of an apparatus employing a modification of the rotor of FIG. 8 wherein provision is made for dual removal of the heavy phase; and FIG. 12 is a side elevational view of a modified form of the central partition wall of the apparatus of FIGS. 8 and 11, which permits the wall to be utilized in an apparatus which is selectively convertible to any of the set-ups of the foregoing figures, including that of FIGS. 1, 2, 8, and 11.

The apparatus of FIGURE 1 may be taken as illustrative of the general features of all of the apparatuses described herein. As shown in FIG. 1, the apparatus includes a rotor casing 10 which is mounted coaxially on a shaft 11 and provides a radially-extending working space therein. Casing 10 is of cylindrical configuration, being formed of a cylindrical outer band or wall 10a and endplates 10b and 10c. The endplates 10b and 10c are received within recesses in the outer ends of band 10a and are connected thereto by welding or other means of attachment, as well as to shaft 11, which, in the illustration given, extends through the inner portion of the rotor working space. It will be understood that this provides a sealed casing around the working space.

Shaft 11 extends horizontally and is rotatively mounted on a base 12 by means of suitable bearings 13a, 13b. An outer enclosure or shell 14 extends around the upper portion of the rotor 10, and is adapted for ready removal to permit access to the rotor.

As is well known in the art, means is provided for driving the shaft 11 at controlled rotational speeds, such as the driven sheave 150. Conduits are connected to stationary shaft extensions 15 and 16 for the introduction and removal of liquids through passages in the shaft. In the illustration given, the right-hand portion of shaft 11 and the corresponding shaft extension 16 are provided with a central passage 17, and two surrounding annular passages 18 and 19. In the operational set-up of FIGURE 1, central passage 17 is employed for supplying the light phase, the inner end of the passage connecting with branch passages which in turn connect to the light phase inlet tubes 20, 21. The shaft passage 18 connects with branch passages which in turn connect with the heavy phase inlet tubes 22, 23. Endplate 10c includes passages 24, 25 which connect with branch passages in the shaft communicating with the outer shaft passage 19. In the illustration given, these passages are designed for use in the removal of the heavy liquid.

Similarly, the left-hand portion of shaft 11 and the corresponding shaft extension 15 are provided with a central passage 26 and two annular passages 27 and 28. Inner passage 26 communicates with branch passages in the shaft which extend to the inner portion of the rotor to provide for the removal of the light liquid. Passage 27 through branch passages communicates with heavy phase inlet tubes 29, 30. Endplates 10b provides passages 31, 32 which communicate with shaft passage 28 through connecting branch passages. In the set-up of FIGURE 1, these last-mentioned passages are employed for the removal of the heavy liquid.

In accordance with the present invention, rotor 10 is provided internally with a partition means 33 which extends through and divides the rotor working space, the partition, as shown, preferably extending outwardly between shaft 11 and the outer portion of the rotor casing, which in the embodiment shown is the cylindrical band 10a. Partition means 33 divides the working space into two side-by-side working chambers 34 and 35 wherein substantially different pressure conditions can be simultaneously maintained. The inner end of partition 33 is rigidly connected and sealed to shaft 11 by some suitable means such as welding, as is the outer end of the partition to casing band 10a.

For convenience of reference, the right-hand chamber 35 may be designated as the first working chamber, while the left-hand chamber 34 may be designated as the second working chamber. It will be understood, of course, that these chambers and the respective operational arrangements and functions may be reversed. In accordance with the present invention, the first working chamber, such as the chamber 35, is provided with a heavy phase inlet means for supplying the heavier liquid from one of the shaft passages to a radially intermediate portion of the chamber. In the embodiment of FIGURE 1, the heavy phase inlet means comprises the tube 22 which connects with the shaft passage 18. In certain embodiments of the present invention, the second working chamber, such as the chamber 34, is also provided with a heavy phase inlet means. For example, in the embodiment of FIG. 1, chamber 34 is provided with heavy phase inlet tube 29 which communicates with shaft passage 27.

The first chamber (e.g., 35) is also provided with a light phase inlet means for supplying the lighter liquid from another of the shaft passages to a radially intermediate portion of the first chamber. For example, chamber 35 is provided with light phase inlet tube 20 which communicates with shaft passage 17. It will be noted that the heavy phase inlet means is positioned radially inward of the light phase inlet means. This is necessary in order to provide a countercurrent contacting section between the heavy and light phase inlets.

In certain embodiments of the present invention, such as the embodiment of FIG. 2, which will subsequently be explained in detail, both of the chambers may be provided with light phase inlet means. However, in the embodiment of FIG. 1, no light phase inlet means is provided in the second chamber 34 from the shaft.

In accordance with the present invention, only one of the working chambers is provided with both light and heavy phase inlet means. For example, in the embodiment of FIG. 1, the first chamber 35 is provided with both light and heavy phase inlet means, while the second chamber 34 is provided with only heavy phase inlet means. In other embodiments, as will subsequently be described, those chambers may be provided with light phase inlet means, but in that event only one of the chambers will be provided with heavy phase inlet means. In other embodiments, one of the chambers will be provided with both heavy and light inlet means, while the other chamber will not be provided with either heavy or light phase inlet means.

Also in accordance with the present invention, the second one of the chambers, such as chamber 34 in the embodiment of FIG. 1, will be provided with light phase outlet means which communicates with another one of the shaft passages. For example, shaft passage 26 through branch passages communicates with the inner portion of chamber 34, and thereby provides the light phase outlet from this chamber. In the embodiment of FIG. 1, no light phase outlet communicates directly with a shaft passage as provided in the first chamber 35. In other embodiments, as will be subsequently described, both chambers may be provided with such light phase outlet means.

A heavy phase outlet means is also provided in the outer portion of the second chamber, such as the chamber 34 of FIG. 1. Specifically, passage 31 communicates with the outer portion of chamber 34 for removal of the heavier liquid through the shaft passage 28. Preferably, both of the chambers are provided with heavy phase outlet means. By way of illustration, the first chamber 35 is also provided with a heavy phase outlet means comprising the passage 25 which communicates with shaft passage 19. In certain embodiments of the present invention, the first chamber may be provided with a heavy phase outlet means in the form of a by-pass which is arranged to permit heavy liquid to flow from the outer portion of the chamber directly into the outer portion of the second chamber, thereby causing the combined heavy liquids to move outwardly through the heavy phase outlet passage which connects a shaft passage to the outer portion of the second chamber. The embodiment of FIG. 8, which will subsequently be described in detail, illustrates this arrangement. Consequently, it may be stated that both chambers are provided with heavy phase outlet means which are arranged to permit the heavy liquid to pass to another one of the shaft passages, either directly or by means of a by-pass to the heavy liquid passage extending from the other chamber.

From what has been previously said, it will be understood that the first one of the chambers, such as the chamber 35, will be provided with only one outlet means, that is, with either a heavy phase outlet or a light phase outlet, but not both. In the embodiment of FIG. 1, chamber 35 is provided with the heavy phase outlet 24. It is, therefore, essential in practicing the present invention to provide liquid transfer means for passing the other phase than the phase to which the outlet means is provided in the first chamber, from the first chamber to the second chamber. More particularly, the liquid transfer means will selectively pass the liquid for which no outlet means is provided in the first chamber from one radial position in the first chamber to a different radial position in the second chamber. For example, in the embodiment of FIG. 1, partition means 33 is provided with radially-extending passages 36 and 37. As shown in FIG. 1, the passages have inlets communicating with the inner portion of chamber 35 and outlets communicating with an intermediate portion of chamber 34. In other words, the liquid transfer means includes an inlet from the first chamber, a passage extending through the partition means, and an outlet into the second chamber. Where the second chamber is provided with a heavy phase inlet, such as the heavy phase inlet 29, the outlet from the passage 36 will be positioned outwardly of the point of discharge of the heavy phase inlet, thereby providing a countercurrent extraction section therebetween.

In the embodiment of FIG. 1, passage 36 transfers clarified light liquid from the inner portion of chamber 35 to chamber 34 for contacting with fresh heavy liquid or for contact with a second heavy liquid. In one operational set-up, as illustrated in FIG. 1, fresh heavy liquid may be introduced through shaft passage 27 into chamber 34, while either fresh or recycled heavy liquid or a second heavy liquid can be introduced into chamber 35 through shaft passage 18. For example, clarified heavy liquid removed from chamber 34 through passages 31, 28 may be recycled and reintroduced into the rotor through passage 18 and tubes 22, 23 for reextraction with the light liquid in chamber 35. As previously explained, the light liquid is introduced first into the chamber 35 through passage 17 and tubes 20, 21, and is then transferred to chamber 34 through the transfer passage 36.

In the embodiment of FIG. 1, six shaft passages are provided, and this requires six dynamic seals to permit the liquids to be transferred from rotating shaft 11 to the stationary shaft extensions 15, 16. In this embodiment, seals 38, 39, and 40 are respectively provided in shaft extension 16 for cooperation with shaft passages 19, 18, and 17. Similarly, seals 41, 42, and 43 are provided in shaft extension 15 for cooperation with shaft passages 26, 27, and 28. Since the construction of such seals is well known in the art, it is not believed it will be necessary to further describe them herein.

Certain letter and legends have been applied to FIG. 1 to further clarify the liquid flows. The letters LLO refer to light liquid out, while LLI refers to light liquid in. Similarly, HLI refers to heavy liquid in, while HLO refers to heavy liquid out. The letters H and L refer to the heavier liquid and the lighter liquid. The symbol $P_I$ designates the principal interface, the purpose and operation of which will be subsequently described.

In accordance with prior practice, each of the working chambers within which a countercurrent extraction is being carried out are preferably provided with a plurality of radially spaced, contacting elements. More specifically, it is important to provide such contacting elements in the countercurrent or extracting section of the chamber, although it is also usually desirable to extend the elements into the clarifying sections. In the contacting section, the elements promote the repeated mixing and coalescence of the phases to provide a multiple stage extraction, while in the clarifying sections the elements promote coalescence and clarification. The elements may be in the form of perforated rings, as described in prior Patents 2,758,783 and 2,758,784. For some purposes, a continuous perforated spiral may also be utilized to provide the axially spaced partition walls. Variations in the contacting elements which may be employed are described in prior Patents 2,758,783 and 2,840,301, as well as in pending application Ser. No. 303,792, filed Aug. 22, 1963, now Patent 3,285,508, issued Nov. 15, 1966 and Ser. No. 303,833, filed Aug. 22, 1963 and now abandoned. A variation in the swirl arresting elements which may be employed in the clarifying sections of the rotor is described in Patent 3,053,440. In the embodiment of FIG. 1, both chambers 35 and 36 are provided with perforated, axially concentric, radially-spaced rings 44, which extend from the light phase clarifying sections through the contacting sections and into the heavy phase clarifying sections. The ends of the rings are respectively supported in grooves in the endplates 10b, 10c, and partition 33, as indicated in FIG. 1.

In the design of centrifugal apparatus, it will be understood that the rotor components should be constructed and arranged in accordance with the principle of axial symmetry. This permits the rotor to be dynamically balanced. In the embodiment of FIG. 1, the flow passages providing the phase inlet and outlet means and phase transfer means are arranged in pairs, but other arrangements are feasible, such as the provision of three of each of the means within the rotor spaced 120° apart, etc. More than one pair of any inlet or outlet means can be provided, and usually at least two pairs of each means will be employed.

Turning now to FIG. 2, there is a shown a modification of the apparatus of FIG. 1 which may be employed for the dual contacting or extracting of a heavy liquid with one or two light liquids, the operation being the reverse of that described for FIG. 1. The corresponding parts have been given the name numbers as in FIG. 1, except that where the elements have been modified, the numbers have been primed.

In the embodiment of FIG. 2, chamber 34' may be regarded as the first chamber, while chamber 35' is the second chamber. Chamber 35' includes heavy phase inlet means 29 and light phase inlet means 31'. The light phase inlet means 31' is a modification of the heavy phase outlet means 31 of FIG. 1, the passage extending through the endplate 10b'. Passage 31' communicates with an intermediate portion of chamber 34' outwardly of the heavy phase inlet 29, supplying light liquid thereto from shaft passage 28. In the embodiment of FIG. 1, shaft passage 28 was used for the removal of the heavy phase.

Partition means 33' includes a modified transfer passage means 36' which has its inlet communicating with the outer portion of chamber 34' and its outlet communicating with an intermediate portion of chamber 35' inwardly of the point of introduction of the light phase through the light phase inlet means 20. The heavy phase is removed from the outer portion of chamber 35' through the passages 24, 19, as in the embodiment of FIG. 1. The light phase is removed from each of the chambers 34', 35' from the inner portions of the chambers through branch passages communicating respectively with shaft passages 26 and 18. It will be noted that shaft passage 18 in the embodiment of FIG. 1 was employed for the introduction of heavy phase, and for which purpose it communicated with the heavy phase inlet tube 22. In the embodiment of FIG. 2, no inlet tube is provided communicating with the shaft passage 19.

It will be understood that chambers 34' and 35' may be provided with contacting elements, such as the rings 44 illustrated in FIG. 1. For increased clarity of description, the elements have been omitted from FIG. 2, but will be understood as being present.

In FIG. 3, there is shown a further modification of the apparatus of FIGS. 1 and 2 which is selectively convertible to the operational set-up of either FIG. 1 or FIG. 2. The corresponding parts have been given the same numbers as in FIG. 1, except that where the parts have been modified, the numbers have been increased by 100. More specifically, the heavy phase inlet means 122 in chamber 135 is selectively convertible to a light phase outlet means. The heavy phase outlet means 131 associated with the second chamber 134 is selectively convertible to a light phase inlet means. The liquid transfer means 136 in partition 133 is selectively convertible from the arrangement described in connection with FIG. 1 to the arrangement described in connection with FIG. 2. The specific means illustrated for effecting these various conversions will now be further described.

In the embodiment of FIG. 3, the heavy phase inlet tube 122 is provided with outlet ports 122a so that the heavy phase applied to passage 18 is discharged into chamber 135 through the ports 122a. Tube 122 has a threaded inner end which is received in shaft 11 and extends outwardly into an opening in casing ring 10a. This opening is closed by means of a threaded plug 103 which seals against a gasket 104. The outer end of tube 122 is provided with a wrench socket 122b. This permits tube 122 to be selectively inserted and removed, as required. For example, plug 103 can be removed, and a wrench inserted in socket 122b to unscrew the tube 122 and permit its removal, thereby obtaining the condition illustrated in FIG. 4.

A heavy phase outlet means 131 is provided with two radially-spaced ports 131a and 131b. In the operational set-up of FIG. 3, only the port 131a is operative. This is achieved by means of a tube 105 which is slidably received in the outer portion of the passage 131, and held therein by means of a removable plug 106 which bears against a gasket 107. Tube 105 is provided near one end with a plurality of circumferentially spaced ports 105a. These ports are located so that when the tube is in the position of FIG. 3, at least one of the ports will line up with the port 131a. Since the ports 105a are provided around the entire circumference of the tube, it will not be necessary to index the tube to any particular rotational position.

Preferably, the ports 105a are located in relation to the ports 131a and 131b so that in one position (FIG. 3) at least one of the ports 105 is in alignment with the opening 131a, while in the reverse position the ports are in alignment with the port 131b. This condition is illustrated in FIG. 4, where the port 105 is reversed. This makes port 131b operative, while rendering port 131 inoperative. The reversal is effected by simply removing plug 106, withdrawing port 105, turning it over, and reinserting it with the replacement of plug 106.

The transfer means 136 in partition 133 communicates with radially spaced openings 136a and 136b which connect the passage with chamber 134. Similarly, passage 136 communicates with radially spaced openings 136c and 136d which connect it with the chamber 135. In the operational set-up of FIG. 3, only ports 136a and 136c are operative, while ports 136b and 136d are inoperative. This is accomplished by means of a tube 100 which is slidably received within the passage 136, being held therein by means of a plug 101 which bears against the gasket 102. It will be understood that plug 101 (as well as plug 106) provides an unthreaded shank portion which bears against the outer end of the slidable tube. Tube 100 is provided near one end with a series of circumferentially spaced ports 101a, and at the other end with circumferentially spaced ports 100b. In the operational set-up of FIG. 3, at least one of the ports 100a is adapted to align with the port 136, while at least one of the ports 100b is adapted to align with the port 136c. This permits light phase to flow from the inner portion of chamber 35 through ports 136, 100b upwardly to tube 100 and out through ports 100a, 136a into chamber 134. The arrangement is therefore functionally substantially identical to that described in connection with FIG. 1.

When tube 100 is withdrawn, reversed and reinserted in passage 136, a condition will be achieved as illustrated in FIG. 4. In this arrangement, the ports 136a and 136c will be operative, while port 136d will align with tube port 100a, and port 136b will align with tube port 100b. The resulting arrangement is therefore substantially identical to that descibed in connection with FIG. 2. The transfer passage is now adapted for passing heavy phase from chamber 134' (designated as the first chamber in connection with FIG. 2) to chamber 135' (designated as the second chamber in connection with FIG. 2). As previously indicated, the tube 105 is in reverse position in FIG. 4 as compared with that in FIG. 3 so that passage 131' provides a light phase inlet for chamber 134'. In connection with chamber 135', passage 18 functions as a light phase outlet, the tube 122 of FIG. 3 having been removed.

FIGS. 5, 5A, 6, and 7 show the various convertible means in greater detail. In FIG. 5, the tube 105 is shown in the position of FIG. 3, while in FIG. 5A tube 105 is reversed to the position of FIG. 4. FIG. 6 illustrates the two positions of the tube 100, the left-hand position being that of FIG. 3, while the right-hand position is that of FIG. 4. FIG. 7 shows the upper portion of the tube 122.

In FIG. 8, there is illustrated a further modification of the apparatus of FIG. 1. Corresponding parts have been given similar numbers, except that the numbers have been increased by 200. The apparatus of FIG. 8 is adapted for reclarification of the light liquid in the chamber 234 (the second chamber), after it has been extracted in the first chamber 235. Chamber 235 includes a light phase inlet 220 communicating with shaft passage 217, and a heavy phase inlet 222 communicating with shaft passage 218. Endplate 210c does not provide a heavy phase outlet passage, and therefore the right-hand portion of shaft 211 includes only passages 217 and 218.

Partition means 233 includes the transfer passage 236 which receives light phase from the inner portion of chamber 235 and transfers it to the intermediate portion of chamber 234, as in the embodiment of FIG. 1. Chamber 234 includes a light phase outlet communicating with shaft passage 226, and a heavy phase outlet comprising passage 231 communicating with shaft passage 228. Chamber 234 does not include a heavy phase inlet, and therefore the left-hand portion of shaft 211 includes only passages 228 and 226. The apparatus of FIG. 8 therefore includes a total of four shaft passages, which would each be equipped with one seal, making a total of four seals.

The heavy phase outlet from chamber 235 comprises by-pass openings 204 which are circumferentially spaced apart and provided in the outer portion of partition 233, as indicated in FIGS. 8 and 9. Heavy liquid can flow from the outer portion of chamber 235 through the by-pass openings 204 into the outer portion of chamber 234 and then into the heavy phase outlet means 231 which communicates with the shaft passage 228. Heavy phase can therefore be removed from both chambers 234 and 235 through a single shaft passage.

Preferably, the by-pass openings 204 are provided with passage-restricting means for selectively varying the flow cross sections of the by-pass openings. In the illustration given, a threaded plug 205 is adjustably received in a bore which extends across passage 205 and into casing band 210a. The arrangement is shown more particularly in FIGS. 9 and 10. As there indicated, the plug 205 can be rotated by removing threaded closure 202, which seals against gasket 203, and inserting a tool such as a screw driver in the slot in the outer end of the plug 205. The plug may therefore be used as a throttle to vary the flow across section of passage 205, or the plug may be closed completely where it is desired to operate the apparatus as illustrated in FIG. 11.

The embodiment of FIG. 11 is quite similar to that of FIG. 8, and therefore the corresponding parts have been given the same numbers. The principal difference is that endplate 210c is provided with a passage 224 connecting with a shaft passage 219 for removal of the heavy phase from chamber 235. This permits plug 205 to be positioned to close the passage 204. With this arrangement, the heavy phase is removed separately from each of the chambers 234 and 235, and five passages are provided in the shaft 211, together with five corresponding seals.

The apparatus of FIG. 11 can also be employed for reclarification of the light phase, the extraction being carried out in the first chamber 235, and the reclarification of the light phase in the second chamber 234. It will be understood that at least the first chamber 235 will be provided with the contacting elements as previously described, and preferably both chambers will be provided with such elements. The provision of perforated rings or other elements in chamber 234 will promote the clarification of the light phase.

In FIG. 12, there is shown a modification of the partition means, the modified partition being designated as 333. When this modified partition is substituted for partition 133 and its associated components of FIG. 3, the apparatus of FIG. 3 can be selectively converted to any of the operational set-ups heretofore described, including the set-ups of FIGS. 1, 3, 8, and 11.

The partition 333 includes the convertible tubes 300, which are similar in construction to the tubes 100 of the apparatus of FIG. 3. The tubes 300 are received in passages 336, which are similar in construction to the passages 136. In the embodiment shown, two pairs of the adjustable transfer means are employed. Partition 333 is also provided with variable by-pass means, including specifically the by-pass openings 304, the adjustable plugs 305, and the closures 302. These elements are similar in construction to the corresponding elements 202, 204, and 205 of the embodiments of FIGS. 8 and 11.

When the apparatus of FIG. 3 is provided with the partition means 333, the by-pass opening means will be operated in closed position with the operational set-up of FIGS. 1, 2, and 11, while they will be employed in an open position for the setup of FIG. 8. The convertible tubes 300 will be used in the position illustrated in FIG. 3 when it is desired to operate as described in connection with FIGS. 1, 3, 8, or 11. These tubes will be employed in the reverse position, as illustrated in FIG. 4, when it is desired to operate in the manner of FIG. 4. The convertible tubes 105 will be employed in the position of FIG. 3 when operating in the manner described with respect to FIGS. 1, 3, 8 and 11, while being employed as shown in FIG. 4 when operating as described in connection with that figure.

The apparatus of FIG. 3 equipped with the partition 333 may be operated like the embodiment of FIG. 8 by simply rendering passage 27 inactive, closing the other end of this passage, and by similarly rendering the outer end of shaft passage 19 inactive. If it is then desired to operate as described in connection with FIG. 11, the outer end of shaft passage 19 can be opened, and heavy phase removed through this passage. It will therefore be seen that this invention contemplates a highly flexible and readily convertible apparatus, which may be used selectively (1) for dual contacting or extraction of the heavy phase or the light phase, with recirculation of either phase, or (2) or sequential contacting or extraction of one phase with two different liquids, or (3) for reclarification of the light phase with single or dual removal of the heavy phase.

The operation of the apparatus of this invention will be readily apparent from the foregoing discussion to those familiar with the operation of similar equipment. It should be pointed out, however, that apparatus constructed in accordance with the present invention permits independent control of the primary interface in each of the working chambers. As is well known in the art, the primary interface is the principal boundary within the rotor between the two phases. Outwardly of the principal interface, the heavy phase is substantially continuous, while inwardly of the boundary the light phase is substantially continuous. If it is desired to fill the rotor with the light phase, the inlet and outlet pressure conditions will be controlled so that the principal interface is positioned inwardly with respect to the contacting section of the rotor. Correspondingly, if it is desired to fill the rotor with the light phase, the principal interface will be positioned toward the outside of the contacting section.

In FIGS. 1, 2, 8 and 11, an illustrative position of the principal interface $P_I$ is indicated in each of the chambers. In FIG. 1, the interface $P_I$ is positioned outwardly with respect to the contacting section of the rotor so that the rotor is substantially filled with the light phase. The opposite condition is illustrated in FIG. 2, where the $P_I$ for both chambers is positioned toward the inside of the contacting section so that the rotor chambers are substantially filled with the heavy phase. It may be desired to fill the chambers with the low volume phase, the high volume phase therefore being dispersed in the low volume phase in the contacting section, rather than vice versa. In this case, if the light phase is the low volume, the operating condition might approximate that of FIG. 1, or that of FIG. 2 if the heavy liquid is the low volume phase. However, the principal interface can be controlled independently in each chamber at any radial position required for the particular process.

Referring again particularly to FIG. 1, the $P_I$ in chamber 35 can be controlled by varying the back pressure on the final HLO (shaft passage 19) in relation to the pressure with which the recycled heavy phase is supplied through passage 18. It will be understood that a pump will be used to supply this phase, even if the heavy phase is being recycled, since additional pressure will be required for reintroducing the heavy phase. The light liquid will also be pumped into passage 17 under pressure. For example, the light liquid might be supplied to chamber 35 at 150 p.s.i., while the heavy phase is supplied at 120 p.s.i. Back pressure on the heavy phase as removed from chamber 35 can be maintained at 50 p.s.i. where it is desired to fill the chamber with the light phase. By increasing the back pressure on the heavy phase being removed from chamber 35, or, more particularly, by increasing the ratio of the back pressure on the removed heavy phase to the introduction pressure of the heavy phase, the $P_I$ can be caused to move inwardly within chamber 35 independently of the $P_I$ position in chamber 34.

The $P_I$ in chamber 34 can also be independently controlled by controlling the back pressure on the light liquid as removed through the passage 26. The pressure at which the light phase is transferred from chamber 35 to chamber 34 would be determined by the pressure conditions within chamber 35, and by the centrifugal head difference arising from the difference in density between the heavy phase in 31 and the light in 36. Consequently, varying the back pressure on the light liquid as removed from chamber 34 permits the ratio of the back pressure to be varied with respect to the pressure at which light liquid is introduced into chamber 34 through the transfer passage 36. When this ratio is relatively high, the $P_I$ will be toward the outside of the chamber, as illustrated in FIG. 1, while the ratio is reduced, the $P_I$ will move in toward the shaft.

Where the light liquid is pumped the chamber 35 at 150 p.s.i. and a back pressure of say 50 p.s.i. is maintained on the heavy phase leaving the chamber 35, a back pressure of 90 p.s.i. on the light liquid as removed from chamber 34 would produce the $P_I$ position illustrated in FIG. 1. In this method of operation, the fresh HLI can be pumped into passage 27 at a pressure of 90 p.s.i., while substantially no back pressure needs to be maintained on the heavy phase as it is removed through shaft passage 28. It will be understood that the foregoing pressure figures have been given merely for the purpose of illustration, and that they may vary widely under actual operating conditions in accordance with procedures well known in the art.

By the means of the invention disclosed herein, it is possible to achieve twice as many theoretical extraction stages in a rotor of a given diameter than was previously possible. This achievement is gained at only a marginal increase in cost, since only one drive, one pair of bearings, one base, etc., are required, and therefore a device can be constructed as disclosed herein for far less cost than can two simple centrifugal extractors running in series.

The following examples illustrate typical applications of centrifugal apparatus incorporating the features of the present invention.

*Example 1*

A dual compartmented rotor constructed as in FIG. 1 may be used for the extraction of hydrogen peroxide from an organic working solution with water. For example, the organic solution can be fed to the extractor at a rate of about 200 g.p.m. at a pressure of about 195 p.s.i. Water (5 g.p.m.) is delivered to fresh HLI port at a pressure of about 25 p.s.i., and the dilute hydrogen peroxide discharged from the intermediate HLO port at atmospheric pressure. This stream can be recycled to the opposite end of the extractor via a small pump discharging at about 105 p.s.i. A back pressure of about 75 p.s.i.a. is maintained on the concentrated hydrogen peroxide aqueous solution leaving the final HLO port. A back pressure of about 25 p.s.i. is maintained on the extracted organic solution leaving the LLO port. As high as 99% of the hydrogen peroxide can be recovered from the organic solution by this means, whereas using a single compartment rotor of the same diameter and with the same number of contacting elements, only 94.0% of the hydrogen peroxide is recovered.

*Example 2*

A dual compartmented rotor constructed as in FIG. 1 may be used for refining, water washing, and rewater washing of a crude peanut oil. For example, 40 g.p.m. of the peanut oil can be mixed with 3 g.p.m. of 8.5% w. caustic and fed to the LLI port of the extractor at about 98 p.s.i. 5 g.p.m. of fresh wash water can be supplied to the recycle HLI port. In the first chamber, the soapstock is separated from the peanut oil near the periphery, and the bulk of the dissolved soap is washed from the refined peanut oil by the countercurrent water wash. The refined peanut oil is passed to the second chamber where it is again washed countercurrently with 7 g.p.m. of water, thereby further lowering the soap content of the oil. The final soap content of the peanut oil can be as low as 44 p.p.m. When comparable refining and water washing was done in a single-chambered contactor, the residual soap content will be of the order of 300 to 600 p.p.m.

*Example 3*

A dual compartmented rotor constructed as in FIG. 2 may be used for the refining of a lubricating oil with furfural. For example, 60 g.p.m. of oil can be charged at about 112 p.s.i to the first chamber, and 48 g.p.m. of intermediate raffinate discharged from the same chamber at about 55 p.s.i., while the spent furfural is discharged at atmospheric pressure. 180 g.p.m. of fresh furfural can be charged to the second chamber at about 114 p.s.i. The intermediate raffinate from the first chamber is pumped up to about 165 p.s.i. and introduced into the second chamber. A back pressure of about 108 p.s.i. is held on the final raffinate leaving the second chamber. By this means, an oil with an improved viscosity index can be achieved. When the temperature and solvent ratio is adjusted to produce a refined oil of the same viscosity index as achieved in conventional extractors, the yield of refined oil can be increased.

*Example 4*

A dual compartmented rotor constructed as in FIG. 1 may be used for the removal of catalyst residue from a terpene resin solution via a phosphoric acid wash, simultaneously followed by a caustic neutralization in the same contactor. The terpene resin solution is fed as the LLI to the first chamber, where it is countercurrently contacted with dilute phosphoric acid for deactivation of the catalyst contained in the resin solution. The dilute aqueous slurry is discharged through the HLO port, while the terpene resin solution is passed through the channels in the divider partition to the second chamber. There, it is countercurrently washed with a dilute caustic solution to provide a neutral product containing no excess acid. The aqueous salt solution is discharged through the intermediate HLO port.

While in the foregoing specification this invention has been described in relation to certain preferred embodiments thereof and many details have been set forth for the purpose of illustration, it will be apparent to those skilled in the art that the invention is susceptible to additional embodiments and that many of the details described herein can be varied considerably without departing from the basic principles of the invention.

We claim:

1. Apparatus for countercurrently contacting and separating at least partially immiscible liquid phases of different densities, said apparatus being of the kind including a rotatably mounted, horizontally-extending shaft providing a plurality of liquid flow passages therein, liquid seals at each end of said shaft to permit liquids to be introduced into and removed from said shaft passages while said shaft is rotating, and a rotor casing mounted coaxially on said shaft and providing a pressure-retaining working space therein extending outwardly from said shaft, the combination comprising partition means mounted within said rotor casing to extend outwardly between said shaft and the outer portion of said casing, said partition means dividing said working space into two side-by-side working chambers wherein substantially different pressure conditions can be simultaneously maintained, heavy phase inlet means for supplying a heavy liquid from one of said shaft passages to a radially intermediate portion of at least a first one of said chambers, light phase inlet means for supplying a light liquid from another of said shaft passages to a radially intermediate portion of at least said first one of said chambers, the heavy phase inlet means being radially inward of the light phase inlet means, only said first of said chambers being provided with both said light and heavy phase inlet means, light phase outlet means extending from the inner portion of at least the second one of said chambers and communicating with a third one of said shaft passages, heavy phase outlet means in the outer portion of at least the second one of said chambers arranged to permit a heavy liquid to pass to at least another one of said passages, the first of said chambers having only one of said outlet means, and liquid transfer means for passing the other phase than the phase for which said outlet means in said first chamber is provided from one radial position in said first chamber to a different radial position in said second chamber, said liquid transfer means including an inlet from said first chamber, a passage extending through said partition means, and an outlet into said second chamber.

2. The combination of chail 1 wherein said first chamber is provided with heavy phase outlet means, said transfer means inlet being located at the inner portion of said first chamber for receiving light liquid, said transfer means outlet being located at an intermediate portion of said second chamber radially inward of the heavy phase outlet means.

3. The combination of claim 2 wherein said first chamber heavy phase inlet means is selectively convertible to a light phase outlet means, said second chamber heavy phase outlet means is selectively convertible to a light phase inlet means, and said liquid transfer means is selectively convertible from the arrangement specified in claim 2 to an arrangement wherein said transfer means inlet is located at the outer portion of said first chamber for receiving heavy liquid, and said transfer means outlet is located at an intermediate portion of said second chamber radially inward of the light phase inlet means.

4. The combination of claim 2 wherein both of said chambers are provided with a plurality of radially spaced contacting elements, and wherein said shaft includes six passages and six of said seals are provided, and one of said heavy phase inlet means also being provided in said second chamber.

5. The combination of claim 1 wherein said first chamber is provided with a light phase outlet means, said transfer means inlet being located at the outer portion of said first chamber for receiving heavy liquid, said transfer means outlet being located at an intermediate portion of said second chamber radially inward of the light phase inlet means.

6. The combination of claim 5 wherein both of said chambers are provided with a plurality of radially spaced contacting elements, and wherein said shaft includes six passages and six of said seals are provided, and one of said light phase inlet means also being provided in said second chamber.

7. The combination of claim 1 wherein said partition means is provided with a plurality of by-pass openings in the outer end portions thereof providing communication between the outer portions of said first and second chambers, and adjustable passage-restricting means being provided for selectively varying the flow cross section of said by-pass openings, said restricting means being adjustable to a position to completely close said by-pass means.

8. Apparatus for countercurrently contacting and separating at least partially immiscible liquid phases of different densities, said apparatus being of the kind including a rotatable mounted, horizontally-extending shaft providing a plurality of liquid flow passages therein, liquid seals at each end of said shaft to permit liquids to be introduced into and removed from said shaft passages while said shaft is rotating, and a rotor casing mounted coaxially on said shaft and providing a pressure-retaining working space therein extending outwardly from said shaft, the combination comprising partition means mounted within said rotor casing to extend outwardly between said shaft and the outer portion of said casing, said partition means dividing said working space into two side-by-side working chambers wherein substantially different pressure conditions can be simultaneously maintained, a plurality of radially spaced contacting elements provided at least in a first one of said chambers, heavy phase inlet means for supplying a heavy liquid from one of said shaft passages to a radially intermediate portion of said first one of said chambers, light phase inlet means for supplying a light liquid from another of said shaft passages to a radially intermediate portion of said first one of said chambers, the heavy phase inlet means in said first chamber being radially inward of the light phase inlet means therein, light phase outlet means extending from the inner portion of the second one of said chambers and communicating with a third one of said shaft passages, heavy phase outlet means in the outer portion of each of said chambers arranged to permit heavy liquid to pass to at least another one of said passages, liquid transfer means for passing the light phase from said first chamber to said second chamber, said transfer means including an inlet from the inner portion of said first chamber, a passage extending through said partition means, and an outlet into the intermediate portion of said second chamber, and heavy phase inlet means in said second chamber inwardly of said transfer means outlet.

9. The combination of claim 8 wherein said second chamber is also provided with a plurality of said radially spaced contacting elements, said first chamber heavy phase inlet means being selectively convertible to a light phase outlet means, said second chamber heavy phase outlet means being selectively convertible to a light phase inlet means, and said liquid transfer means being selectively convertible from the arrangement of claim 8 to an arrangement wherein said transfer means inlet is located at the outer portion of said second chamber, and said transfer means outlet is located at an intermediate portion of said first chamber inwardly of the light phase inlet means therein.

10. In a centrifugal apparatus for countercurrently contacting and separating at least partially immiscible liquid phases of different densities, said apparatus being of the kind including a rotatively mounted, horizontally-extending shaft providing at least four liquid flow passages therein, liquid seals cooperating with each of said passages to permit liquids to be introduced and removed from said shaft passages while said shaft is rotating, and a rotor casing mounted coaxially on said shaft and providing a pressure-retaining working space therein extending outwardly from said shaft, the combination comprising partition means mounted within said rotor casing to extend outwardly between said shaft and the outer portion of said casing, said partition means dividing said working space into two side-by-side working chambers wherein substantially different pressure conditions can be simultaneously maintained, a plurality of radially spaced contacting elements provided in each of said chambers, heavy phase inlet means for supplying the heavier liquid from one of said shaft passages to a radially intermediate portion of the first one of said chambers, light phase inlet means for supplying the lighter liquid from another of said shaft passages to a radially intermediate portion of the first one of said chambers, the heavy phase inlet means being radially inward of the light phase inlet means therein, light phase outlet means extending from the inner portion of the second one of said chambers and communicating with a third one of said shaft passages, heavy phase outlet means in the outer portion of each of said chambers arranged to permit heavy liquid to pass to at least the fourth one of said passages, and liquid transfer means for passing the light phase from said first chamber to said second chamber, said liquid transfer means including an inlet from the inner portion of said first chamber, a passage extending through said partition means, and an outlet into the intermediate portion of said second chamber, said transfer means outlet being radially inward of the heavy phase outlet from said second chamber.

11. The combination of claim 10 wherein said heavy phase outlet means in said first chamber comprises by-pass opening means provided in the outer end portion of said partition means for passing heavy liquid from the outer portion of said first chamber to the outer portion of said second chamber and thereby to the heavy phase outlet means in said second chamber.

12. The combination of claim 11 wherein there is also provided adjustable passage-restricting means for selectively varying the flow cross section of said by-pass means.

13. The combination of claim 10 wherein said shaft provides five passages and five of said seals are provided, the fourth one of said passages communicating with the heavy phase outlet means in said second chamber, the fifth one of said passages communicating with the heavy phase outlet means in said first chamber.

14. The combination of claim 10 wherein five of said shaft passages are provided and five of said seals are provided, the fourth one of said shaft passages communicating with the heavy phase outlet means in said second chamber, the fifth one of said shaft passages communicating with the heavy phase outlet means in said first chamber, said combination also including by-pass opening means in the outer end portion of said partition means providing communication between the outer portions of said first and second chambers, and adjustable passage-restricting means being provided for selectively varying the flow cross section of said by-pass means, said passage-restricting means being adjustable to a position to completely close said by-pass opening means, whereby the heavy phase in the outer portion of said first chamber may selectively be passed to said fifth shaft passage or to said second chamber.

References Cited

UNITED STATES PATENTS

| | | | |
|---|---|---|---|
| 2,422,882 | 6/1947 | Bramley | 233—18 X |
| 2,867,582 | 1/1959 | Shuman et al. | |
| 3,053,440 | 9/1962 | Doyle et al. | 223—15 |
| 3,107,218 | 10/1963 | Doyle | 223—15 |
| 3,116,246 | 12/1963 | Podbielniak | 223—15 |
| 3,221,985 | 12/1965 | Burdett | 223—15 |

M. CARY NELSON, *Primary Examiner.*

HENRY T. KLINKSIEK, *Examiner.*